J. M. Elliott,

Seed Planter.

No. 108,988.  Patented Nov. 8, 1870.

Witnesses:
Alex. F. Roberts
L. S. Mabee

Inventor:
J. M. Elliott
per Munn
Attorneys.

United States Patent Office.

JAMES M. ELLIOTT, OF WINNSBOROUGH, SOUTH CAROLINA.

Letters Patent No. 108,988, dated November 8, 1870.

IMPROVEMENT IN SEED-PLANTERS.

The Schedule referred to in these Letters Patent and making part of the same.

*To all whom it may concern:*

Be it known that I, JAMES M. ELLIOTT, of Winnsborough, in the district of Fairfield and State of South Carolina, have invented a new and useful Improvement in Seed-Planter; and I do hereby declare that the following is a full, clear, and exact description thereof, which will enable others skilled in the art to make and use the same, reference being had to the accompanying drawing forming part of this specification.

My invention has for its object to furnish an improved machine for planting cotton and other seeds, and for distributing guano and other fine fertilizers, and which shall at the same time be simple in construction and effective in operation; and It consists in the construction and combination of the various parts of the machine, as hereinafter more fully described.

A are the side bars of the machine, which are connected to each other and held in their proper relative positions by the cross-bars or rounds B, and upon the rear ends of which are formed handles for controling the machine.

Figure 1:
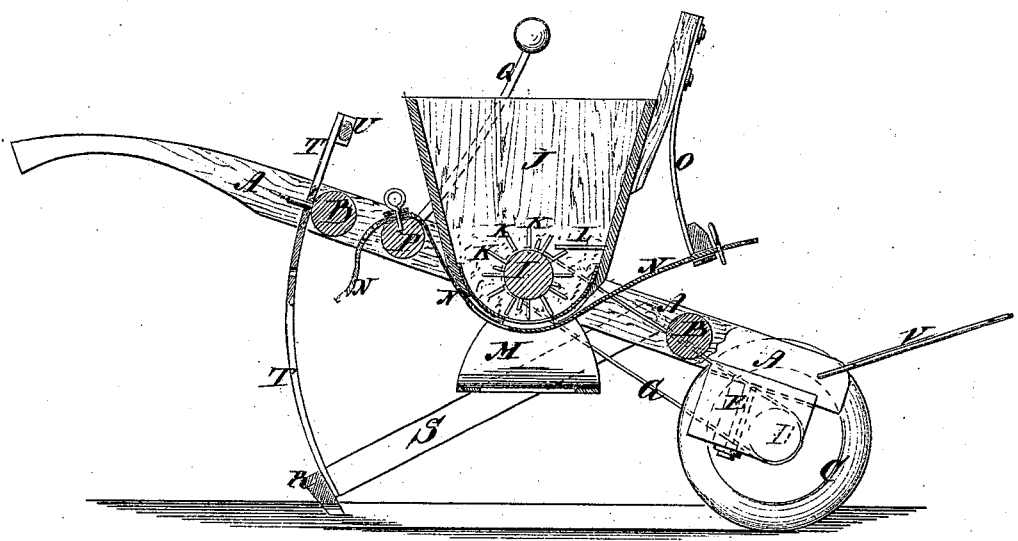
Figure 1 is a vertical longitudinal section of my improved machine, taken through the line x x, fig. 2.
Figure 2:
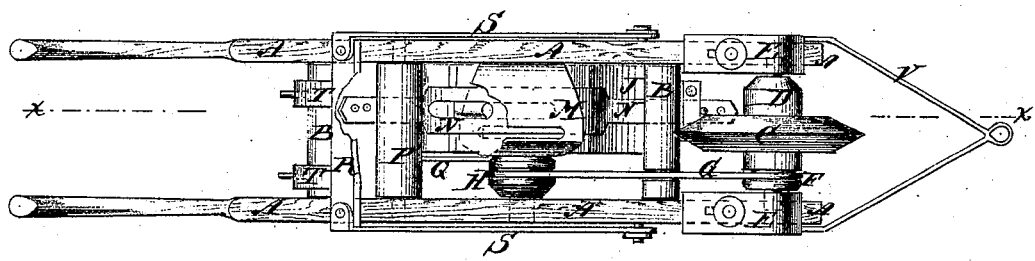
Figure 2 is a bottom view of the same, parts being broken away to show the construction.

C is a wheel for opening the ground to receive the seed, the face of which is made V-shaped, as shown in figs. 1 and 2.

The beveled or V-shaped face of the wheel C may be plated with cast ring-plates, made in two or more sections.

The wheel C is attached to a shaft, D, the journals of which revolve in the bearings or blocks E, which are bolted to the under side of the forward ends of the bars A, said bolts passing through slots in the said block, so that the blocks may be shifted to regulate the tautness of the band or chain.

The blocks E are grooved upon their upper sides, to fit upon the lower sides of the bars A, to enable them to be held more firmly.

To the shaft D is attached a pulley, F, around which passes an endless band or chain, G, which also passes around the pulley H attached to the stirrer-shaft I, which passes through and works in bearings in the sides of the hopper J.

The hopper J is securely attached to one of the side bars A, and its bottom is made in the form of an arc of a circle, and is slotted, to allow the seed to pass out.

To the shaft I, within the hopper J, is attached a circle of radial fingers, K, which, as the said shaft revolves, passes through the slot in the bottom of the hopper J and forces out the seeds.

The shaft I, in addition to the fingers K, has other fingers attached to its end parts, to keep the seed in the lower part of the hopper stirred up.

To the forward side of the lower part of the hopper J are attached stationary fingers L, between which the fingers K pass, and which tend to separate the seeds and enable them to pass more readily through the slot in the bottom of the hopper J.

M is a V-shaped plate, the ends of which are attached to the sides of the hopper J, and which is slotted in its lowest part or angle, to allow the seed to pass through to the ground.

One of the inclined parts of the plate M is made longer than the other part, to bring the slot in its lower part to the center of the machine, and directly over the furrow opened by the wheel C.

The escape of the seed or fertilizer through the slot in the bottom of the hopper J is regulated or wholly prevented by the strap N, which is slotted to allow the seed to pass through, passes beneath the curved bottom of the hopper J, and its forward end passes through a block or keeper attached to the lower or free end of the spring O, where it is adjustably secured by a pin passed through one or the other of the holes through the said strap.

The rear end of the strap N passes through a notch, slot, or keeper formed in or attached to the shaft P, where it is adjustably secured by a pin passed through the said strap N.

The journals of the shaft P work in bearings in the bars A, and to it is rigidly attached the lower end of the lever Q, so that, by operating the lever Q, the strap N may be made to wholly or partially cover the discharge slot through the bottom of the hopper, to regulate or prevent the escape of the seed.

The lever Q is held in place when adjusted by pins attached to the side of the hopper J, and when the said lever is released the elasticity of the spring O at once draws the strap N back to its former position.

R is the covering-block, the under side of which is concaved to give the proper form to the top of the row or ridge, and its ends are securely attached to the lower ends of the bars S, the upper ends of which are pivoted to the side bars A a little in front of the hopper J.

To the coverer R are attached the lower ends of the spring bars T, the upper ends of which are connected by a round or handle, U, and which have holes formed through them, to receive pins attached to the rear cross-bar B, to hold the coverer securely in any position into which it may be adjusted.

V is the draft-bar, which is pivoted to the forward ends of the side bars A, as shown in figs. 1 and 2.

Having thus described my invention,

I claim as new and desire to secure by Letters Patent—

1. The combination of the frame A B, V-shaped heel C, adjustable blocks or bearings E, pulley F, endless chain or band G, pulley H, stirrer I K, hopper J, stationary fingers L, and V-shaped guide-plate I, with each other, substantially as herein shown and described, and for the purpose set forth.

2. The combination of the spring O, slotted strap N, roller P, and lever Q, with each other, and with the slotted bottom of the hopper J, substantially as herein shown and described, and for the purpose set forth.

3. The combination of the pivoted bars S, covering-block R, and adjustable spring bars T, with each other and with the frame A B, substantially as herein shown and described, and for the purpose set forth.

JAMES M. ELLIOTT.

Witnesses:
 JAS. A. BRICE,
 O. M. CLARKE.